(12) United States Patent
Szczypinski et al.

(10) Patent No.: US 10,889,084 B2
(45) Date of Patent: Jan. 12, 2021

(54) SYSTEMS AND APPARATUS HAVING JOINED PORTIONS AND METHODS OF MANUFACTURE

(71) Applicant: Microsoft Technology Licensing, LLC, Redmond, WA (US)

(72) Inventors: David Kazmierz Szczypinski, Bothell, WA (US); Ronald B. Smith, Redmond, WA (US); Mikhail Bruk, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 15/620,661

(22) Filed: Jun. 12, 2017

(65) Prior Publication Data

US 2018/0099481 A1 Apr. 12, 2018

Related U.S. Application Data

(60) Provisional application No. 62/407,284, filed on Oct. 12, 2016.

(51) Int. Cl.
*B32B 7/08* (2019.01)
*B32B 7/12* (2006.01)

(52) U.S. Cl.
CPC . *B32B 7/08* (2013.01); *B32B 7/12* (2013.01)

(58) Field of Classification Search
CPC ........................................................ B32B 7/08
USPC ........................................................ 428/141
See application file for complete search history.

(56) References Cited

U.S. PATENT DOCUMENTS

| 4,578,172 | A * | 3/1986 | Yamada | G01N 27/417 204/406 |
| 6,097,455 | A * | 8/2000 | Babuka | G09F 9/35 349/158 |
| 6,459,462 | B1 * | 10/2002 | Seraphim | G02F 1/13336 156/298 |
| 2004/0109666 | A1 * | 6/2004 | Kim, II | H01L 31/035281 385/147 |
| 2005/0154099 | A1 | 7/2005 | Kobayashi et al. | |
| 2009/0115042 | A1 * | 5/2009 | Koyanagi | H01L 24/19 257/686 |
| 2010/0048257 | A1 | 2/2010 | Prest et al. | |
| 2010/0091442 | A1 | 4/2010 | Theobald et al. | |
| 2012/0049702 | A1 | 3/2012 | Difonzo et al. | |
| 2012/0061850 | A1 * | 3/2012 | Kuroda | H01L 21/6836 257/774 |
| 2012/0120562 | A1 | 5/2012 | Prest et al. | |
| 2013/0255875 | A1 | 10/2013 | Lozano villarreal | |

(Continued)

*Primary Examiner* — Brent T O'Hern
(74) *Attorney, Agent, or Firm* — Ray Quinney & Nebeker P.C.; Paul N. Taylor

(57) ABSTRACT

An apparatus is described. The apparatus includes a first portion having a first material and a first interface surface. A second portion having a second material that is different than the first material is included. The second portion has a second interface surface that is connected to the first interface surface of the first portion. A method of manufacturing an apparatus is described. The method includes adhering a first portion of the apparatus to a second portion of the apparatus to create a combined portion. After adhering the first portion of the apparatus to the second portion of the apparatus to create the combined portion, the combined portion of the apparatus is treated.

22 Claims, 6 Drawing Sheets

(56) References Cited

U.S. PATENT DOCUMENTS

2014/0168877 A1 6/2014 Theobald et al.
2015/0043141 A1 2/2015 Pegg et al.
2016/0233913 A1 8/2016 Wang et al.
2016/0342179 A1 11/2016 Osborne et al.

* cited by examiner

SYSTEMS AND APPARATUS HAVING JOINED PORTIONS AND METHODS OF MANUFACTURE

CROSS-REFERENCE TO RELATED APPLICATIONS

The present application is a divisional of U.S. Provisional Patent Application Ser. No. 62/407,284, filed Oct. 12, 2016 which is herein incorporated by reference in its entirety.

BACKGROUND

Background and Relevant Art

Use of computing devices is becoming more ubiquitous by the day. Computing devices range from standard desktop computers to wearable computing technology and beyond. Computing devices continue to become more and more thin.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment, an apparatus is described. The apparatus includes a first portion having a first material and a first interface surface. A second portion having a second material that is different than the first material is included. The second portion has a second interface surface that is connected to the first interface surface of the first portion.

In one embodiment, a computing device is described. The computing device includes a first portion and a second portion. The first portion has a first material and a first interface surface. The second portion has a second material that is different than the first material. The second portion has a second interface surface. The second interface surface of the second portion is connected to the first interface surface of the first portion.

In one embodiment, a method of manufacturing an apparatus is described. The method includes adhering a first portion of the apparatus to a second portion of the apparatus to create a combined portion. After adhering the first portion of the apparatus to the second portion of the apparatus to create the combined portion, the combined portion of the apparatus is treated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the embodiments disclosed herein may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to systems and apparatus having joined portions and methods of manufacture. More particularly, this disclosure generally relates to systems and apparatus having a plurality of joined portions and methods of manufacturing the same.

Consumer demand for sleeker products continues to increase. At least one embodiment disclosed herein may provide an interface between two parts with a step and/or gap of less than 1000 microns, 500 microns, less than 400 microns, less than 300 microns, less than 200 microns, or any value therebetween without using insert molding, overmolding, or nanomolding. At least one embodiment disclosed herein may provide the ability to attach two (or more) components of different materials and finish/decorate them as a single component. At least one embodiment disclosed herein may provide the ability to attach two (or more) components of the same material and finish/decorate them as a single component. At least one embodiment disclosed herein may provide the ability to manufacture different components at different times, different locations, and with different manufacturing methods, but still have them finished as one part. At least one embodiment disclosed herein is not limited to two parts with specific plastic resins and specific metals.

Figure 1:
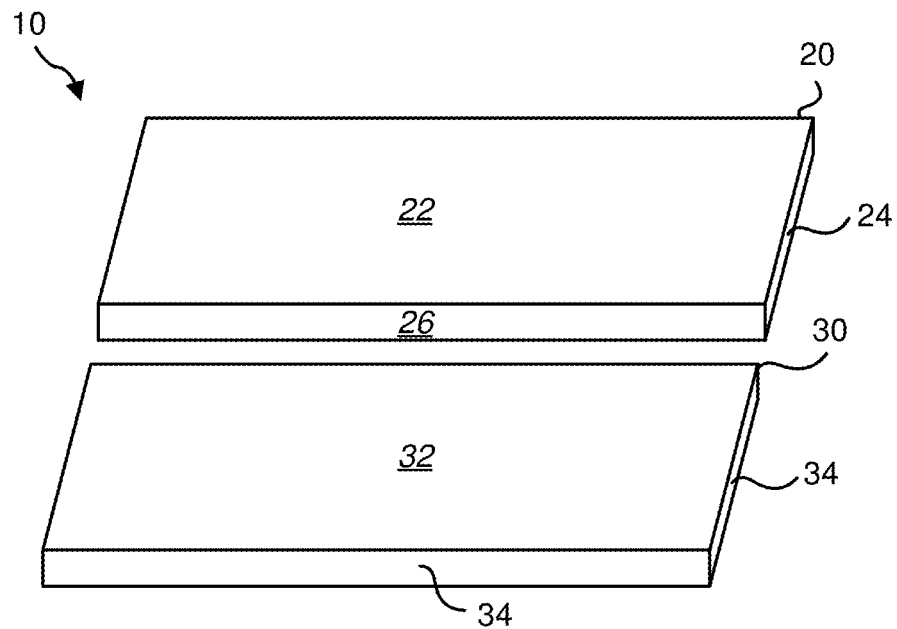
FIG. 1 is an isometric top view of an embodiment of an apparatus with a plurality of portions in a preassembled state.

FIG. 1 is an isometric top view of an embodiment of an apparatus 10 with a first portion 20 and a second portion 30 in a preassembled state. As shown, the apparatus 10 includes two portions 20, 30. In other embodiments, three or more portions may be used.

The first portion 20 and the second portion 30 include a first unfinished surface 22 and a second unfinished surface 32, respectively. The unfinished surfaces 22, 32 may require additional finishing. Additional finishing may include machining, surface treatment, painting, other finishing treatments, or combinations thereof. The first and second portions 20, 30 may include other surfaces 24, 34, respectively, that may not require additional finishing.

Figure 2:
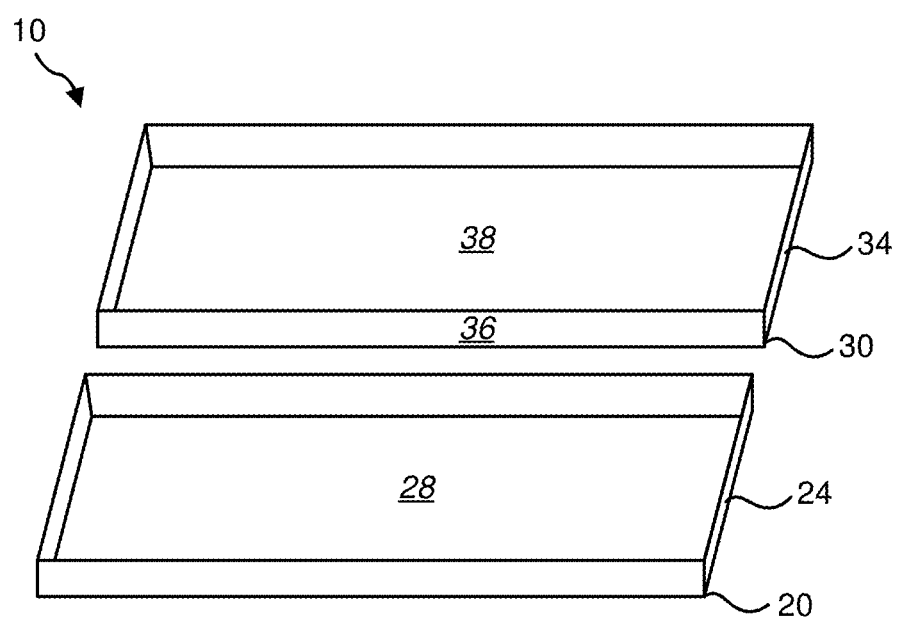
FIG. 2 is an isometric bottom view of the apparatus of FIG. 1 with a plurality of portions in a preassembled state.

FIG. 2 is an isometric bottom view of the apparatus 10 of FIG. 1. As shown in FIG. 2, the first and second portions 20, 30 may include a first pocket 28 and a second pocket 38, respectively. In other embodiments, the first and/or second portions 20, 30 may not have surface features, such as pockets 28, 38.

Referring generally to FIGS. 1 and 2, the first portion 20 and the second portion 30 include a first interface surface 26 and a second interface surface 36, respectively. The interface surfaces 26, 36 may be configured to abut with each other. For example, the interface surfaces 26, 36 are shown as being generally flat surfaces that would substantially abut if placed together. For instance, the shapes of the interface surfaces 26, 36 may be selected such that they abut. In other words, the interface surfaces 26, 36 may both be flat, curved, or otherwise shaped.

The interface surfaces 26, 36 may have a desired surface roughness to facilitate adhering the first and second portions 20, 30 together. For example, the surface roughnesses of the interface surfaces 26, 36 may vary between 1 and 100 microns.

Adhesives (e.g., sheets of adhesive material, liquid glue, single or double part epoxy) may be applied to the interface surfaces 26, 36 such that when abutting the interface surfaces 26, 36 remain in abutting contact with each other and any remaining adhesive in an assembled state. In one example, the first interface surface 26 directly abuts adhesive (not shown) which directly abuts the second interface surface 36. When in the assembled state, the apparatus 10 may then be finished, as will be further described below.

In at least one embodiment, the adhesive may be an electrically insulating adhesive. For example, the adhesive may have a resistance of greater than 10 MΩ, greater than 50 MΩ, greater than 100 MΩ, or any value or range therebetween. Electrically insulating adhesive may provide advantages in cases where the final product will be electrically finished. For example, if the first portion 20 is plastic and the second portion 30 is aluminum, it may be desirable to anodize the second portion 30 while the first portion 20 is connected. Without insulation between the first portion 20 and the second portion 30, the electricity passed through the second portion 30 may also pass through the first portion 20, which may cause physical damage to the first portion 20.

Figure 3:
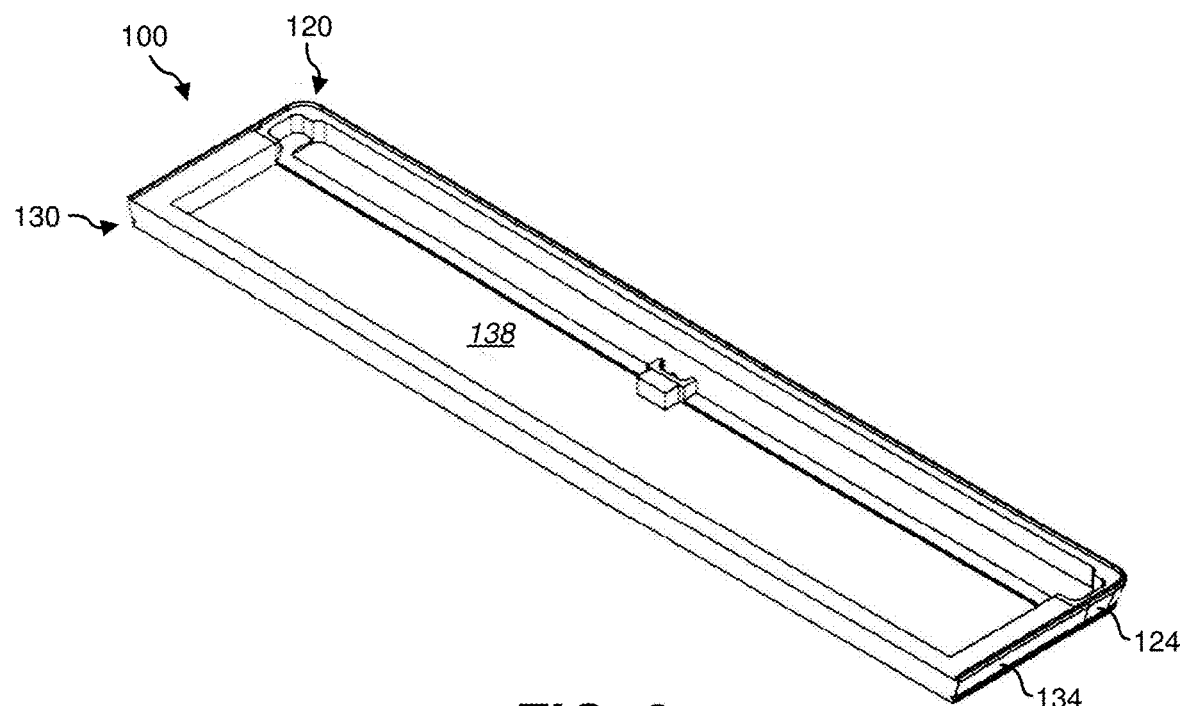
FIG. 3 is an isometric bottom view of another embodiment of an apparatus with a plurality of portions in an assembled state.

FIG. 3 is an isometric bottom view of another embodiment of an apparatus 100 with a first portion 120 and a second portion 130 in an assembled state. The first and second portions 120, 130 may be similar to the first and second portions 20, 30 described above. For example, the first and second portions 120, 130 may include one or more finished surfaces 124, 134, respectively and/or may include a first pocket 128 and a second pocket 138, respectively.

Figure 4:
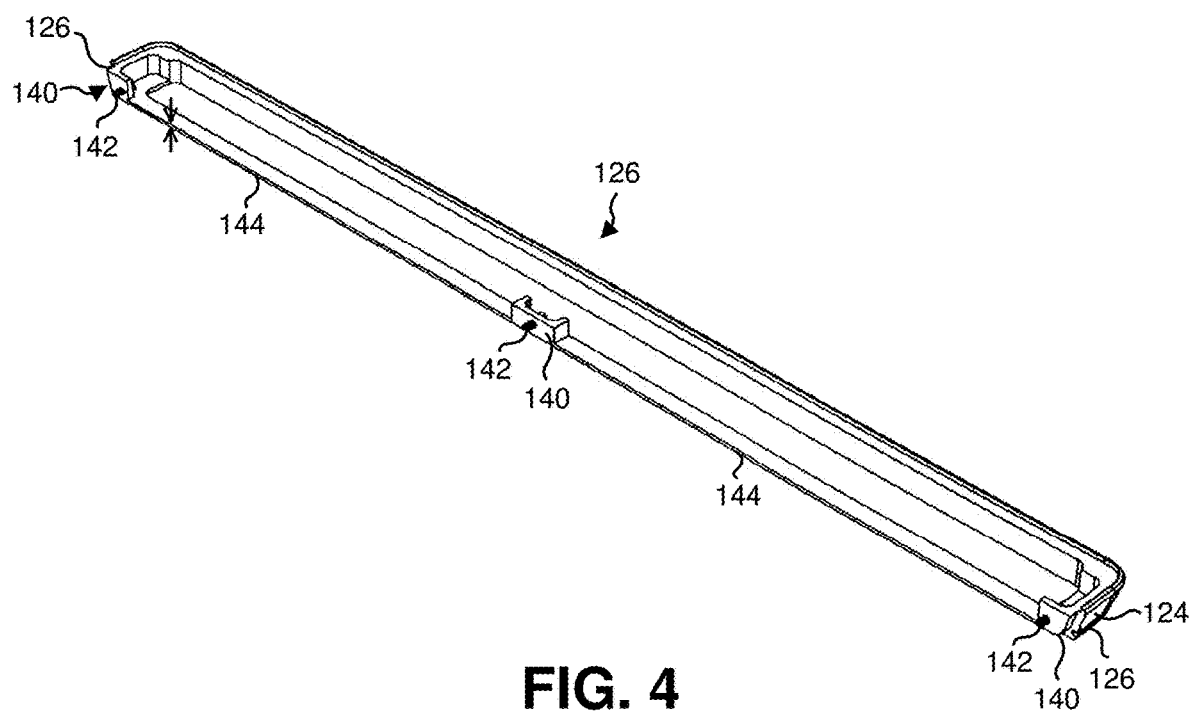
FIG. 4 is an isometric bottom view of the first portion of the embodiment of FIG. 3.
Figure 5:
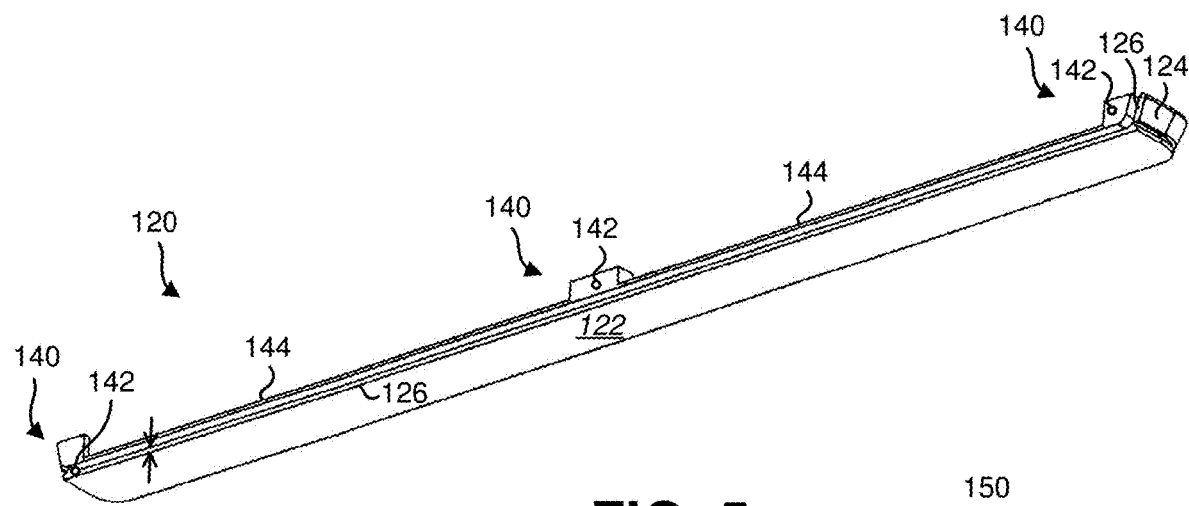
FIG. 5 is an isometric front view of the first portion of the embodiment of FIG. 3.

FIGS. 4 and 5 are isometric views of the first portion 120 of the apparatus 100 of FIG. 3 from the bottom and front, respectively. Referring generally to FIGS. 4 and 5, the first portion 120 includes an unfinished surface 122 and a first interface surface 126. As shown, the first portion may include one or more finished surfaces 124 and/or a pocket 128.

The first portion 120 may include one or more mechanical interlocks 140. The mechanical interlocks 140 may include a locking mechanism 142. As shown, the mechanical interlocks 140 may be a base with an aperture for a locking mechanism 142. The aperture may be threaded or may be a through hole. In other embodiments, other mechanical interlocks may be used, such as a snap fit, detents, a press fit, or other mechanical interlocks. The mechanical interlock 140 may be configured to mechanically connect to a corresponding mechanical interlock 150 on the second portion 130 shown in FIG. 6. As shown in FIG. 5, the first interface surface 126 may be offset from the mechanical interlock 140. For example, as shown, the front surface (not labeled) of the mechanical interlock 140 extends further toward the front than the first interface surface 126. In other embodiments, the mechanical interlock 140 and the first interface surface 126 may be parallel.

The offset shown in FIG. 5 may allow for an overlapping surface 144. The overlapping surface 144 may overlap a surface (e.g., overlapping surface 154 shown in FIG. 6) of the second portion 130. The two overlapping surfaces 144, 154 may be designed to have a gap between them to facilitate alignment of the interface surfaces 126, 136 of the first and second portions 120, 130. In some embodiments, the gap may be such that the overlapping surfaces 144, 154 may only partially abut in the assembled configuration. The gap, as shown, may be about 0.20 mm. In other embodiments, the gap may be smaller and/or larger.

The thickness (indicated by two arrows in FIG. 5) of the first interface surface 126 is shown as 1.00 mm. In other embodiments, the thickness of the first interface surface 126 may be as small as 0.50 mm. In further embodiments, the thickness may be between 0.50 mm and 2.00 mm, between 0.50 mm and 1.00 mm, any value therebetween, greater than 0.50 mm, greater than 1.00 mm, or greater than 2.00 mm.

Figure 6:
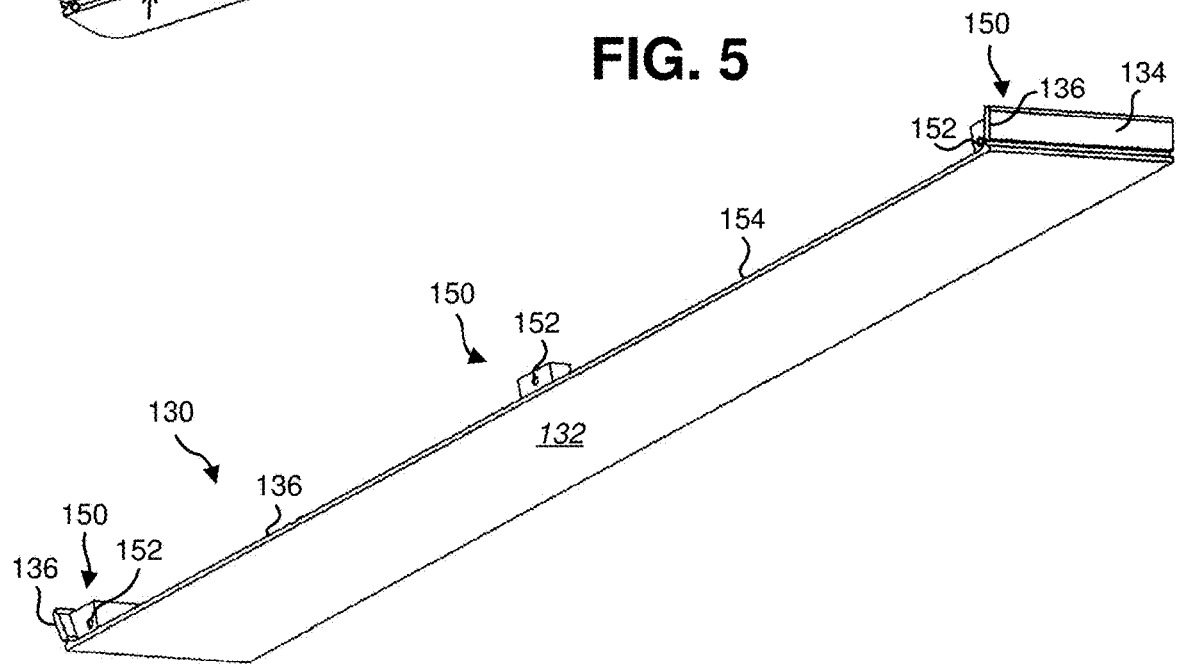
FIG. 6 is an isometric front view of the second portion of the embodiment of FIG. 3.

FIG. 6 is an isometric front view of the second portion 130 of the embodiment of FIG. 3. The second portion 130 illustrates the second interfacing surface 136. The second interfacing surface 136 is shown extending along the entire front of the around a side of the second portion 130. In other embodiments, the second interfacing surface 136 may not extend along a straight line only.

The second portion 130 may include one or more mechanical interlocks 150, which may include one or more locking mechanisms 142. The mechanical interlocks 150 may interface with corresponding mechanical interlocks 140. The locking mechanisms 152 may be threaded to receive a screw or other threaded device such that when a screw is inserted through the aperture of the locking mechanism 142 the screw head may abut the mechanical interlock 140 on the first portion 120 and may be tightened into the threaded locking mechanism 152 of the mechanical interlock 150 on the second portion 130.

As shown in FIG. 6, the mechanical interlocks 150 may be offset from the second interface surface 136. This may allow for an overlapping surface 154.

In another example, a mechanical interlock may include forming micropores in one of the one surface (e.g., the first interface surface) and molding another portion into that one surface including the micropores. In a further example, a mechanical interlock may include molding a second portion over a first portion with a transverse surface (e.g., a dovetail) to retain the two portions together.

In some embodiments, no mechanical interlocks 140, 150 and/or no overlapping surfaces 144, 154 may be used. In other words, the first and second interface surfaces 126, 136 may, in some embodiments, only be held together by the glue between the two surfaces 126, 136 prior to finishing of the apparatus 100.

The first and second portions 120, 130 include a first and second unfinished surfaces 122, 132, respectively (seen best in FIGS. 5 and 6). The unfinished surfaces 122, 132 may require additional finishing. Additional finishing may include machining, surface treatment, painting, other finishing treatments, or combinations thereof. The first and second portions 120, 130 may include other surfaces 124, 134, respectively, that may not require additional finishing.

Referring generally to FIGS. 5 and 6, the interface surfaces 126, 136 may be configured to abut with each other. For example, the interface surfaces 126, 136 are shown as being generally flat surfaces that abut if placed together. The interface surface 126 may be slightly taller (from the first unfinished surface 122 to the pocket 128) than the second interface surface 136 to create a gap. The first and second interface surfaces 126, 136 include straight portions and curved portions. In other embodiments, the interface surfaces 126, 136 may only be straight or curved.

The interface surfaces 126, 136 may have a desired surface roughness to facilitate adhering the first and second portions 120, 130 together. For example, the surface roughnesses of the interface surfaces 126, 136 may vary between 1 and 100 microns.

Adhesives may be applied to the interface surfaces 126, 136 such that when abutting the interface surfaces 126, 136 remain in abutting contact with each other and any remaining adhesive in an assembled state. In one example, the first interface surface 126 directly abuts adhesive (not shown) which directly abuts the second interface surface 136. When in the assembled state, the apparatus 100 may then be finished, as will be further described below.

The first and second portions 20, 120, 30, 130 may be made of the same or different materials. For example, the first portions may be made of a nonferrous and aluminum free material and the second portions may be made of a resin material. In one example, the first portion may be a magnesium alloy and the second portion may be a polycarbonate.

Figure 7:
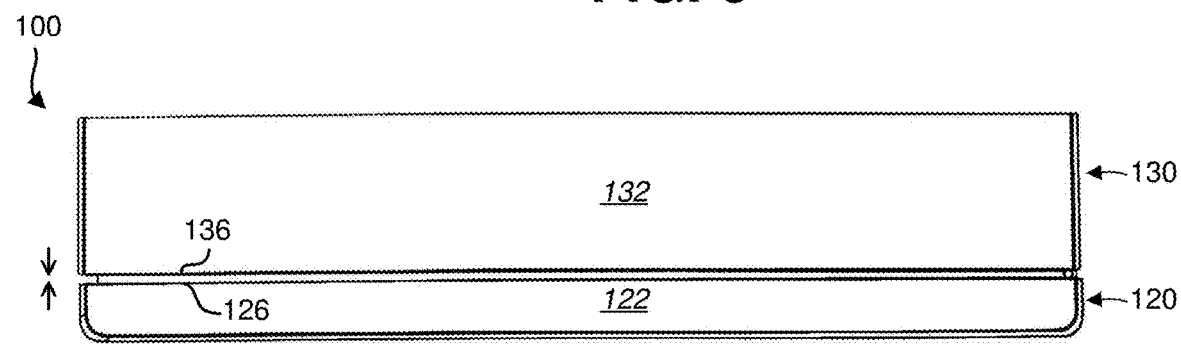
FIG. 7 is top view of the apparatus of FIG. 3 with a plurality of portions with a large gap in an assembled state.

As shown in FIG. 7, the first and second interface surfaces 126, 136 may have a gap (indicated by two arrows). The gap may at least partially and/or fully be filled with adhesive. The two portions 120, 130 may be pressed together such that they are in the assembled state shown in FIG. 8. In the assembled state, the gap (shown by two arrows) may be between 1 and 500 microns, 1 and 400 microns, 1 and 300 microns, 1 and 200 microns, or any range or value therebetween. Once assembled, as shown in FIG. 8, at least a portion of the unfinished surfaces 122, 132 may be finished.

Figure 8:
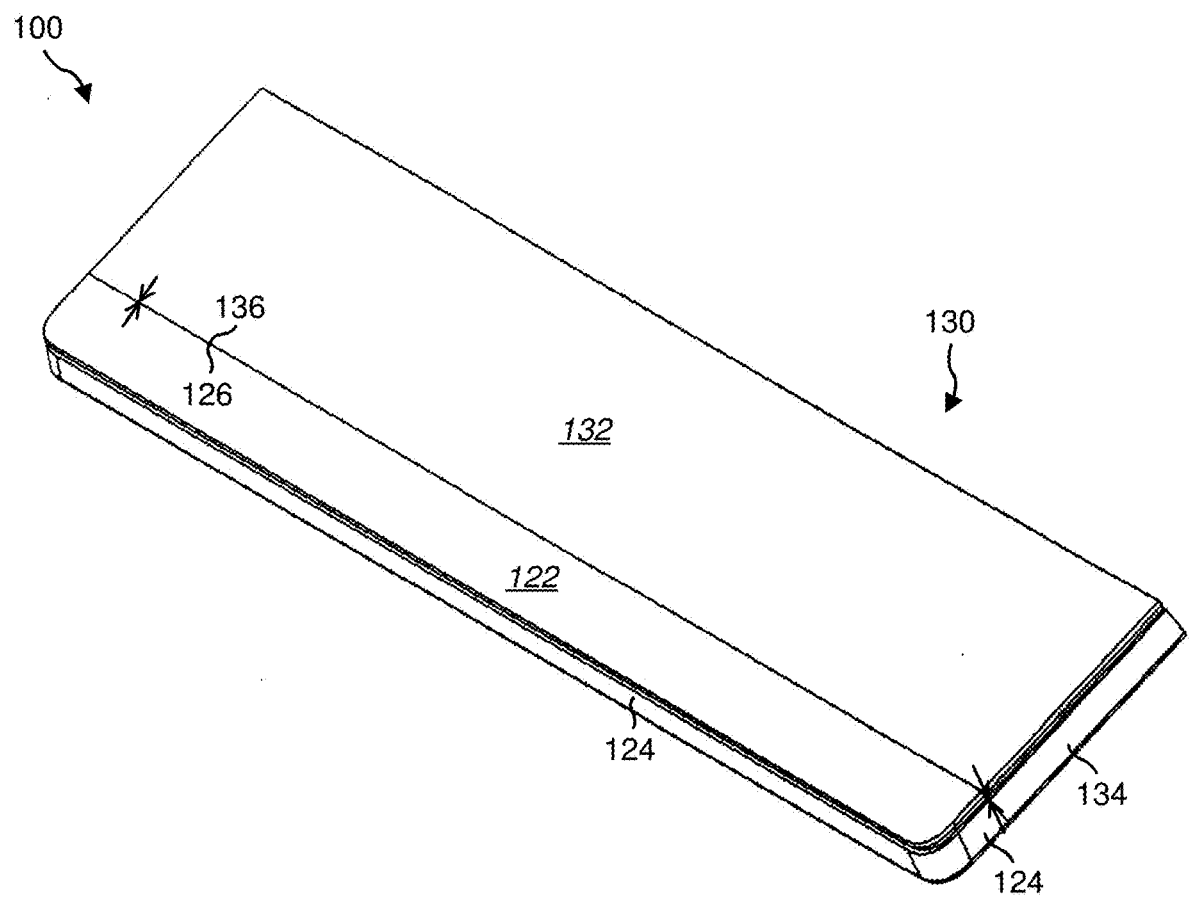
FIG. 8 is top isometric view of the apparatus of FIG. 3 with a plurality of portions with a small gap in an assembled state.

FIG. 8 illustrates a horizontal gap (e.g., between the interface surfaces 126, 136) and a vertical gap (e.g., between the first and second unfinished surfaces 122, 132). The horizontal gap may be less than a certain amount over a length. For example, the horizontal gap may be less than 500 microns over a length of 30 cm, less than 100 microns over a length of 20 cm, less than 50 microns over a length of 10 cm, less than 50 microns over a length of 30 cm, less than 100 microns over a length of 30 cm, and/or other gaps over other lengths.

The vertical gap may be less than 200 microns after the first portion 120 and the second portion 130 are connected but before the first portion 120 and the second portion 130 are co-finished (e.g., assembled and then finished together). In other words, if the first portion 120 and the second portion 130 are connected, the vertical gap between the first unfinished surface 122 and the second unfinished surface 132 may be less than 200 microns. After the first unfinished surface 122 and the second unfinished surface 132 are co-finished (e.g., milled), the vertical gap may be less than 10 microns, less than 5 microns, less than 4 microns, or zero microns (e.g., if the two parts are co-polished).

Figure 9:
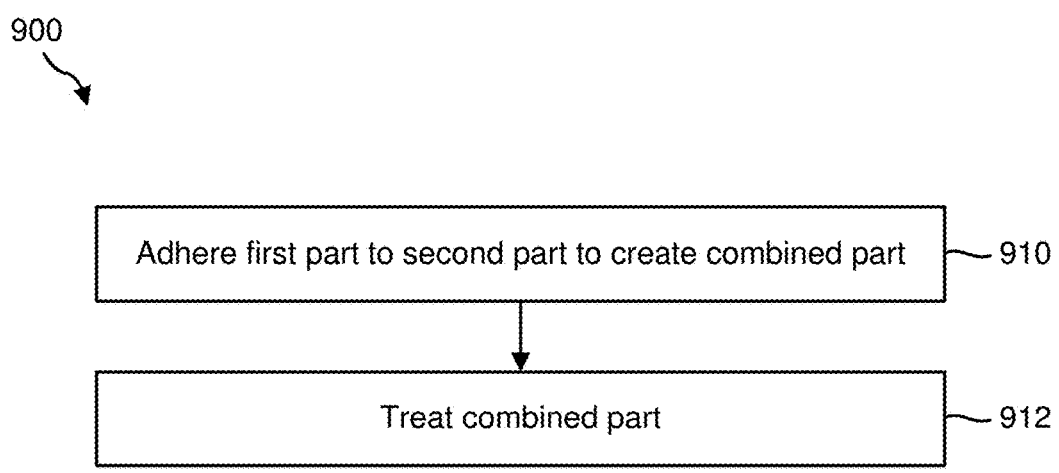
FIG. 9 is a flow chart of an embodiment a method of manufacturing an apparatus.

FIG. 9 is a flow chart of an embodiment a method 900 of manufacturing an apparatus, such as apparatuses 10, 100. The method includes adhering 910 a first part to a second part to create a combined part. For example, the first portions 20, 120 may be adhered to the second portions 30, 130 to create a combined part. The combined part (e.g., apparatuses 10, 100 in their assembled states) is then treated 912. Treating the combined part may include machining, surface treatment, painting, other finishing treatments, or combinations thereof. In at least one embodiment, treating the combined part may provide better surface finish than treating each part (e.g., portion) separately. For example, the assembled gap shown in FIG. 8 may remain between 1 and 500 microns after the combined part is treated 912. Furthermore, the planes of the treated surfaces (e.g., the unfinished surfaces 122, 132 after they are finished) may be substantially parallel such that there is a step of no greater than 500 microns between the two surfaces exists. In other embodiments the step may be between 1 and 500 microns.

Figure 10:
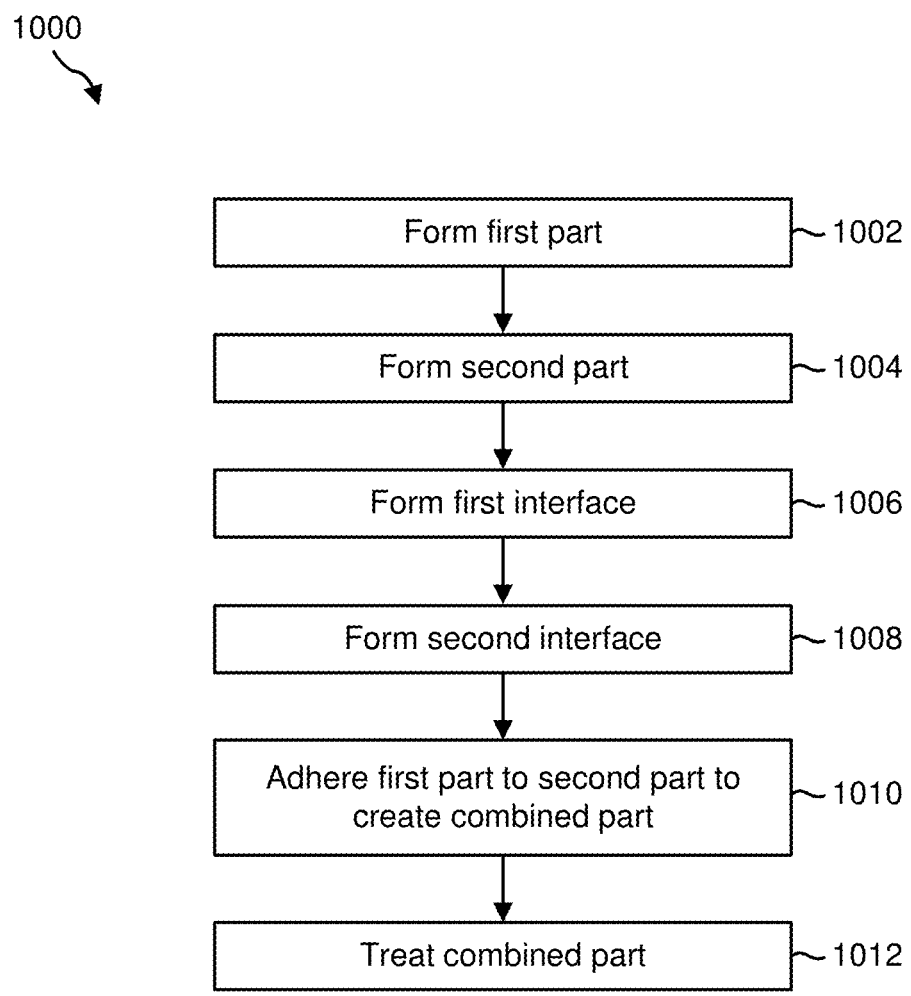
FIG. 10 is a flow chart of another embodiment a method of manufacturing an apparatus.

FIG. 10 is a flow chart of another embodiment a method 1000 of manufacturing an apparatus. The method 1000 may include forming 1002 a first part and/or forming 1004 a second part. Forming 1002 a first part and/or forming a second part 1004 may include casting, machining, injection molding, additive manufacturing, other types of forming, or combinations thereof. A first interface may be formed 1006 and/or a second interface may be formed 1008. For example, the first interface surface 26, 126 may be formed 1006 to mate with the second interface surface 36, 136. The method includes adhering 1010 a first part to a second part to create a combined part. For example, the first portions 20, 120 may be adhered to the second portions 30, 130 to create a combined part. The combined part (e.g., apparatuses 10, 100 in their assembled states) is then treated 1012. Treating the combined part may include machining, surface treatment, painting, other finishing treatments, or combinations thereof. In at least one embodiment, treating the combined part may provide better surface finish than treating each part (e.g., portion) separately. For example, the assembled gap shown in FIG. 8 may remain between 1 and 200 microns after the combined part is treated 1012. Furthermore, the planes of the treated surfaces (e.g., the unfinished surfaces 122, 132 after they are finished) may be substantially parallel such that there is a step of no greater than 500 microns between the two surfaces exists. In other embodiments the step may be between 1 and 500 microns.

Figure 11:
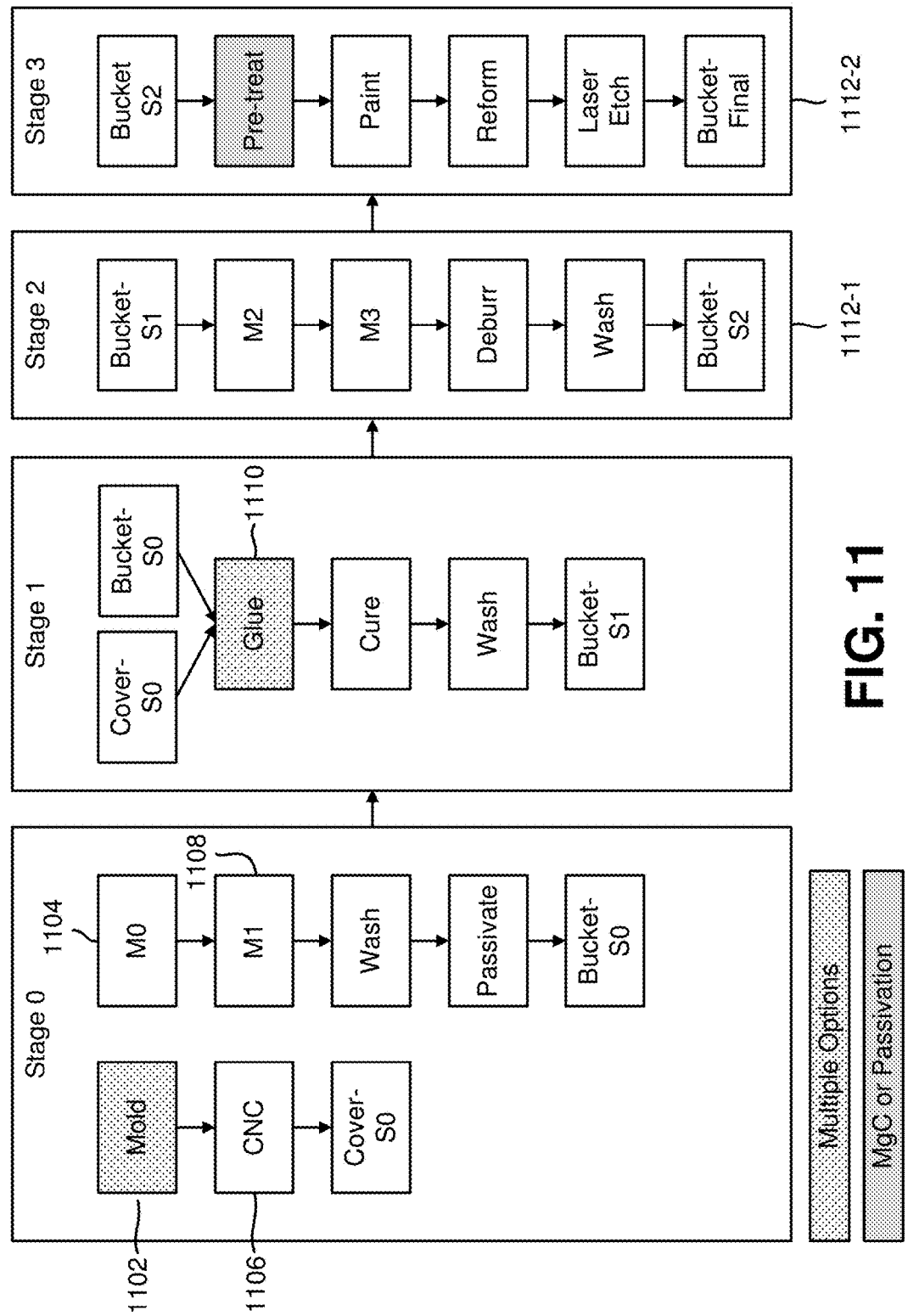
FIG. 11 is a process chart of an embodiment a method of manufacturing an apparatus.

FIG. 11 is a process chart of an embodiment a method 1100 of manufacturing an apparatus (e.g., apparatus 10, 100). The first portion 120 is molded 1102 (e.g., injection molded) into a mold using a resin (e.g., polycarbonate). After molding 1102, the finished surfaces 1124 may be finished. In other embodiments, the finished surfaces 1124 may be further processed. The molded first portion 120 is then machined 1106 (e.g., formed) using a computer numerically controlled machine (e.g., one or more milling operations) to form the first interface surface 126. At this point the first portion 120 is in state "Cover-S0". At a second time, which may be the same time as the molding 1102 and/or machining 1106 acts, the second portion 130 is prepared. Preparation includes machining 1104 the second portion 130, which may include the finished surfaces 134 and/or the second interface surface 136. The second interface surface 136 may then be machined 1108. The second portion 130 may be metallic and thus require washing and/or passivating before moving further in the method 1100. At this point the second portion is in state "Bucket-S0".

The first portion 120 and the second portion 130 may be glued 1110 together to form a combined part. Gluing 1110 may include holding the two portions 120, 130 together until the glue is cured. The combined part may be washed. The combined part is then in state "Bucket-S1".

The combined part may then be treated 1112-1, 1112-2. Treating 1112-1, 1112-2 may include one or more machining operations, deburring, washing, pre-treating, painting, reforming, laser etching, other finishing operations, or combinations thereof.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An apparatus, comprising:
    a first portion having a first material and a first interface surface, the first portion being magnesium; and
    a second portion having a second material, the second portion having a second interface surface, the second interface surface of the second portion connected to the first interface surface of the first portion, and a gap between the first portion and the second portion of between 1 and 500 microns.

2. The apparatus of claim 1, further comprising an adhesive between the first portion and the second portion to fill at least a portion of the gap.

3. The apparatus of claim 2, wherein the adhesive is electrically insulating.

4. The apparatus of claim 3, wherein the electrically insulating adhesive has a resistance of greater than 10 MΩ.

5. The apparatus of claim 2, wherein the first portion and the second portion are separated by a gap of between 1 and 200 microns.

6. The apparatus of claim 1, wherein a first unfinished surface of the first portion and a second unfinished surface of the second portion are separated by a gap of between 1 and 10 microns.

7. The apparatus of claim 1, the first portion being non-ferrous and aluminum free.

8. The apparatus of claim 1, the gap being a horizontal gap, the horizontal gap being between 1 and 200 microns over a length of 30 cm, the second interface surface having a surface roughness of less than 100 microns.

9. The apparatus of claim 8, further comprising an adhesive between the first portion and the second portion.

10. The apparatus of claim 9, wherein the adhesive is electrically insulating.

11. The apparatus of claim 10, wherein the electrically insulating adhesive has a resistance of greater than 10 MΩ.

12. The apparatus of claim 11, the first portion being magnesium.

13. The apparatus of claim 12, the first portion being connected to the second portion without mechanical interlocks.

14. The apparatus of claim 1, wherein the apparatus is electrically finished while the first portion and the second portion are connected.

15. The apparatus of claim 1, wherein the second portion is anodized while the first portion and the second portion are connected.

16. An apparatus comprising:
    a first portion having a first material and a first interface surface; and
    a second portion having a second material, the second portion having a second interface surface, the second interface surface of the second portion connected to the first interface surface of the first portion, and a gap between the first portion and the second portion of between 1 and 500 microns, the first portion being connected to the second portion without mechanical interlocks in the gap and without mechanical interlocks on the first unfinished surface and the second unfinished surface, wherein a first unfinished surface of the first portion and a second unfinished surface of the second portion are separated by a gap of between 1 and 10 microns.

17. The apparatus of claim 16, the first portion being magnesium.

18. An apparatus, comprising:
a first portion having a first material and a first interface surface;
a second portion having a second material that is different than the first material, the second portion having a second interface surface, the second interface surface of the second portion connected to the first interface surface of the first portion, the first interface surface or the second interface surface having a surface roughness of between 1 and 100 microns, a first unfinished surface of the first portion and a second unfinished surface of the second portion are separated by a vertical gap of between 1 and 10 micron; and
an adhesive between the first portion and the second portion to fill at least a portion of a gap between the first portion and the second portion.

19. The apparatus of claim 18, the first portion being connected to the second portion without mechanical interlocks in a gap between the first portion and the second portion and without mechanical interlocks on the first unfinished surface and the second unfinished surface.

20. The apparatus of claim 18, the first portion being magnesium.

21. The apparatus of claim 18, the first portion being connected to the second portion without mechanical interlocks.

22. An apparatus, comprising:
a first portion having a first material and a first interface surface, the first portion being non-ferrous and aluminum free, the first interface surface having a surface roughness of less than 100 microns;
a second portion having a second material that is different than the first material, the second portion having a second interface surface, the second interface surface of the second portion connected to the first interface surface of the first portion, the first portion and the second portion having a horizontal gap between a first interface surface of the first portion and a second interface surface of the second portion of between 1 and 200 microns over a length of 30 cm, the second interface surface having a surface roughness of less than 100 microns; and
an electrically insulating adhesive between the first portion and the second portion.

* * * * *